(12) United States Patent
Grant (10) Patent No.: US 12,250,310 B2
(45) Date of Patent: Mar. 11, 2025

(54) USE OF IRRATIONAL NUMBERS IN ELLIPTIC CURVE CRYPTOGRAPHY

(71) Applicant: Crown Sterling Limited, LLC, Newport Beach, CA (US)

(72) Inventor: Robert Edward Grant, Laguna Beach, CA (US)

(73) Assignee: Crown Sterling Limited, LLC

( * ) Notice: Subject to any disclaimer, the term of this patent is extended or adjusted under 35 U.S.C. 154(b) by 215 days.

(21) Appl. No.: 18/094,747

(22) Filed: Jan. 9, 2023

(65) Prior Publication Data

US 2024/0235834 A1  Jul. 11, 2024

(51) Int. Cl.
*H04L 9/30* (2006.01)

(52) U.S. Cl.
CPC .................................. *H04L 9/3066* (2013.01)

(58) Field of Classification Search
CPC ..................................................... H04L 9/3066
See application file for complete search history.

(56) References Cited

U.S. PATENT DOCUMENTS

| | | |
|---|---|---|
| 4,166,405 A | 9/1979 | Hiyoshi et al. |
| 4,613,901 A | 9/1986 | Gilhousen et al. |
| 4,860,624 A | 8/1989 | Dinnan et al. |
| 4,868,624 A | 9/1989 | Grung et al. |
| 5,033,352 A | 7/1991 | Kellogg |
| 5,516,981 A | 5/1996 | Nagai |
| 5,764,772 A | 6/1998 | Kaufman |
| 5,966,445 A | 10/1999 | Park |
| 5,987,483 A | 11/1999 | Edelkind et al. |
| 6,072,876 A | 6/2000 | Obata |
| 6,154,541 A | 11/2000 | Zhang |
| 6,154,542 A | 11/2000 | Crandall |
| 6,349,319 B1 | 2/2002 | Shankar et al. |
| 6,396,928 B1 | 5/2002 | Zheng |
| 6,448,487 B1 | 9/2002 | Smith |
| 6,480,605 B1 | 11/2002 | Uchiyama |
| 6,636,968 B1 | 10/2003 | Rosner |
| 6,751,736 B1 | 6/2004 | Bowman |
| 6,763,364 B1 | 7/2004 | Wilber |
| 6,778,666 B1 * | 8/2004 | Kuzmich ............. H04L 9/3066 708/492 |
| 6,924,426 B2 | 8/2005 | Clynes |

(Continued)

FOREIGN PATENT DOCUMENTS

| | | |
|---|---|---|
| DE | 102018005247 A1 | 1/2020 |
| EP | 1220174 A1 | 12/2000 |

(Continued)

OTHER PUBLICATIONS

Bhaumik, et al. "Safely Doubling your Block Ciphers for a Post-Quantum World," Inria, Paris. 2020. 49 pages.

(Continued)

*Primary Examiner* — Saleh Najjar
*Assistant Examiner* — Devin E Almeida
(74) *Attorney, Agent, or Firm* — Fish IP Law, LLP; Tomas A. Prieto (57) ABSTRACT

Elliptical curve cryptography (ECC) utilizes an elliptic curve consistent with the formula px mod q=r, where x is a private key having an irrational number component. The irrational component is employed to provide much greater entropy than would be achieved where x is a prime number.

4 Claims, 6 Drawing Sheets

(56) References Cited

U.S. PATENT DOCUMENTS

| | | | |
|---|---|---|---|
| 6,990,200 B1 | 1/2006 | Kasahara | |
| 7,062,044 B1* | 6/2006 | Solinas | H04L 9/3066 708/490 |
| 7,502,754 B2 | 3/2009 | Campbell | |
| 8,468,244 B2 | 6/2013 | Redlich | |
| 8,516,244 B2 | 8/2013 | Waters | |
| 8,885,820 B1 | 11/2014 | Lambert et al. | |
| 9,325,499 B1 | 4/2016 | Juels et al. | |
| 9,425,954 B1 | 8/2016 | Chalker | |
| 9,450,749 B2 | 9/2016 | Hammersmith | |
| 9,674,162 B1 | 6/2017 | Miller et al. | |
| 9,917,699 B2 | 3/2018 | Booth et al. | |
| 10,230,703 B1 | 3/2019 | Lepore | |
| 10,476,665 B1 | 11/2019 | Griffin et al. | |
| 10,911,451 B2 | 2/2021 | Costa | |
| 10,936,744 B1 | 3/2021 | Trepetin et al. | |
| 11,042,653 B2 | 6/2021 | Haager et al. | |
| 11,080,665 B1 | 8/2021 | Poelstra et al. | |
| 11,139,955 B1 | 10/2021 | So et al. | |
| 11,188,977 B2 | 11/2021 | Youb | |
| 11,233,636 B1 | 1/2022 | Peddada et al. | |
| 11,258,617 B1 | 2/2022 | Peddada et al. | |
| 11,279,164 B1 | 3/2022 | Hsu et al. | |
| 11,310,042 B2 | 4/2022 | Grant | |
| 11,443,310 B2 | 9/2022 | Bolla | |
| 11,522,700 B1 | 12/2022 | Auerbach et al. | |
| 11,532,293 B2 | 12/2022 | Beasley | |
| 11,533,173 B2 | 12/2022 | McElveen | |
| 2003/0016823 A1 | 1/2003 | Chung | |
| 2003/0081785 A1 | 5/2003 | Boneh et al. | |
| 2003/0112972 A1 | 6/2003 | Hattick et al. | |
| 2003/0115449 A1 | 6/2003 | Yochim | |
| 2004/0096056 A1 | 5/2004 | Boren | |
| 2004/0200335 A1 | 10/2004 | Phillips | |
| 2005/0271207 A1 | 12/2005 | Frey | |
| 2006/0045262 A1* | 3/2006 | Orlando | G06F 7/725 380/28 |
| 2006/0072745 A1 | 4/2006 | Fukaya | |
| 2006/0177065 A1 | 8/2006 | Halbert | |
| 2006/0262957 A1 | 11/2006 | Asano | |
| 2007/0064930 A1 | 5/2007 | Fischer | |
| 2007/0211893 A1 | 9/2007 | Frosik | |
| 2008/0107274 A1 | 5/2008 | Worthy | |
| 2008/0006140 A1 | 6/2008 | Adams | |
| 2008/0130873 A1* | 6/2008 | Bolotov | H04L 9/3066 380/28 |
| 2008/0184872 A1 | 8/2008 | Hunt et al. | |
| 2008/0208560 A1 | 8/2008 | Johnson | |
| 2008/0257136 A1 | 10/2008 | Meeks | |
| 2009/0146851 A1 | 1/2009 | Lablans | |
| 2009/0094464 A1 | 4/2009 | Futa et al. | |
| 2009/0207999 A1 | 8/2009 | Yonemura et al. | |
| 2009/0216910 A1 | 8/2009 | Duchesneau | |
| 2010/0119061 A1 | 5/2010 | Kawale | |
| 2012/0134495 A1 | 5/2012 | Liu | |
| 2012/0213358 A1 | 8/2012 | Dror et al. | |
| 2013/0142323 A1 | 6/2013 | Chiarella | |
| 2013/0297937 A1 | 11/2013 | Fransen | |
| 2013/0315388 A1 | 11/2013 | Chiarella | |
| 2014/0112469 A1 | 4/2014 | Layne | |
| 2014/0369492 A1* | 12/2014 | Lambert | H04L 9/3066 380/28 |
| 2016/0012252 A1 | 1/2016 | Deleeuw | |
| 2016/0014110 A1 | 1/2016 | Kurspahic | |
| 2016/0042657 A1 | 2/2016 | Granger et al. | |
| 2016/0323736 A1 | 11/2016 | Donahue et al. | |
| 2017/0078087 A1 | 3/2017 | Chalker | |
| 2017/0222804 A1 | 8/2017 | Dewitt | |
| 2017/0302446 A1 | 10/2017 | Thorwirth | |
| 2017/0310650 A1 | 10/2017 | McMullen | |
| 2017/0315212 A1 | 11/2017 | Monferrer | |
| 2018/0039667 A1 | 2/2018 | Pierce et al. | |
| 2018/0101322 A1 | 4/2018 | Cheriton | |
| 2018/0131526 A1 | 5/2018 | Ellingson | |
| 2018/0241548 A1 | 8/2018 | Dolev et al. | |
| 2018/0332010 A1 | 11/2018 | Graber et al. | |
| 2019/0036678 A1 | 1/2019 | Ahmed | |
| 2019/0051276 A1 | 2/2019 | Lathrop et al. | |
| 2019/0089532 A1 | 3/2019 | Lambert | |
| 2019/0120929 A1 | 4/2019 | Meadow | |
| 2019/0173677 A1 | 6/2019 | Christmas et al. | |
| 2019/0238323 A1 | 8/2019 | Bunch | |
| 2020/0084024 A1 | 3/2020 | Myers | |
| 2020/0084037 A1 | 3/2020 | Zhang | |
| 2020/0136819 A1 | 4/2020 | Bae et al. | |
| 2020/0153458 A1 | 5/2020 | Strobel et al. | |
| 2020/0177579 A1 | 6/2020 | Allen | |
| 2020/0228507 A1 | 7/2020 | Anderson et al. | |
| 2020/0241841 A1 | 7/2020 | Tamiya | |
| 2020/0293212 A1 | 9/2020 | Narayanamurthy | |
| 2020/0366652 A1 | 11/2020 | Koyun | |
| 2020/0396059 A1 | 12/2020 | Micali | |
| 2021/0028935 A1 | 1/2021 | Wu et al. | |
| 2021/0065664 A1 | 3/2021 | Ryyanen et al. | |
| 2021/0311188 A1 | 10/2021 | Stuart et al. | |
| 2021/0312055 A1 | 10/2021 | Kloth | |
| 2021/0336766 A1 | 10/2021 | Kim et al. | |
| 2021/0382695 A1 | 12/2021 | Chang et al. | |
| 2022/0027590 A1 | 1/2022 | Sharma et al. | |
| 2022/0085998 A1* | 3/2022 | Xiao | H04L 9/003 |
| 2022/0198034 A1 | 6/2022 | Rodriguez | |
| 2022/0199058 A1 | 6/2022 | Grant | |
| 2023/0007439 A1 | 1/2023 | Williams | |

FOREIGN PATENT DOCUMENTS

| | | |
|---|---|---|
| EP | 1220174 | 7/2002 |
| EP | 2680488 | 8/2019 |
| FR | 2679365 A1 | 1/1993 |
| JP | 2002529774 A | 9/2002 |
| JP | 2007157288 | 6/2007 |
| JP | 2007157288 A | 6/2007 |
| JP | 2007336556 A | 12/2007 |
| JP | 2014026213 A | 2/2014 |
| JP | 2019526201 A | 9/2019 |
| KR | 20010008976 A | 2/2001 |
| KR | 20130051386 A | 5/2013 |
| KR | 101605496 B1 | 3/2016 |
| WO | 199720306 A1 | 6/1996 |
| WO | 0065768 | 11/2000 |
| WO | 2000065768 A1 | 11/2000 |
| WO | 2005085992 | 9/2005 |
| WO | 2005085992 A1 | 9/2005 |
| WO | 2010111320 A2 | 9/2010 |
| WO | 2016135726 A1 | 9/2016 |
| WO | 2016203762 | 12/2016 |
| WO | 2016203762 A1 | 12/2016 |
| WO | 2019110955 | 6/2019 |
| WO | 2019110955 A1 | 6/2019 |

OTHER PUBLICATIONS

"Elliptic Curve Cryptography (Ecc)." 1 page.
"Elliptic Curve Over Finite Non-Prime Fields," Mathematics. 2 pages.
"Golden Ratio Calculator," Good Calculators. 2 pages.
Grant, et al. "Accurate and Infinite Prime Prediction from Novel Quasi-Prime Analytical Methodology." 8 pages.
Grant, Robert E. "Prime Number Pattern Discovery," Discoveries, Publications, Unified Math/Physics. Jul. 2018. 6 pages.
Kumar, et al. "A Symmetric Mecial Image Encryption Scheme Based on Irrational Numbers," Biomed Res 2018 Special Issue. S494-S498. 5 pages.
Grant, et al. "Reciprocal Wave Factorization," Strathspey Crown Holdings. Jun. 2020. 19 pages.
Barker, et al. "Recommendation for Pair-Wise Key Establishment Schemes Using Discrete Logarithm Cryptography," NIST. Apr. 2018. 2 pages.
Weisstein, Eric W. "Taniyama-Shimura Conjecture," Mathworld—A Wolfram Web Resource. 3 pages.
Wang, et al. "A Decentralized Electricity Transaction Mode of Microgrid Based on Blockchain and Continuous Double Action," IEEE. 2018. 5 pages.

(56) References Cited

OTHER PUBLICATIONS

"Why Are Elliptic Curves Constructed Using Prime Fields and Not Composite Fields?" https://crypto.stackexchange.com. 3 pages.
Wu, et al. "Forensic Analysis of Bitcoin Transactions," IEEE. 2019. 3 pages.
Burd, Barry. "A New Approach to Condensing Data Leads to a 99% Compression Rate," TechTarget. May 2015. 9 pages.
Zhang, et al. "A Blockchain-Based Authentication Method with One-Time Password," IEEE, 2019. 9 pages.
"Elliptic Curve Cryptography (ECC)." 1 pages.
"Recommendation for Pair-Wise Key-Establishment Schemes Using Discrete Logarithm Cryptography," NIST. 2 pages.
"Taniyama-Shimura Conjecture," Wolfram Mathworld. 3 pages.
"Why are elliptic curves constructed using prime fields and not composite fields?" www.crypto.stackexchange.com. 3 pages.
"Why is a prime number used in ECDSA?" www.crypto.stackexchange.com. 3 pages.
Overmars, et al. "An Efficient Golden Ratio Method for Secure Cryptographic Applications," School of Engineering, Construction & Design, Melbourne Polytechnic, Preston, Australia. Sep. 17, 2018. 12 pages.
"Prime Number Pattern Discovery," Discoveries, Publications, Unified Math/Physics. Jul. 7, 2018, 6 pages.
Ritam Bhaumik et al., "Safely Doubling your Block Ciphers for a Post-Quantum World", Inria and Orange Labs, 49 pages.
International Search Report and Written Opinion for International Patent Application No. PCT/US2021/064739, dated Apr. 4, 2022, 14 pages.
Gabriela Ahmadi-Assalemi et al., "Federated Blockchain-based Tracking and Liability Attribution Framework for Employees and Cyber-Physical Objects in a Smart Workplace", IEEE, 9 pages.
Wattana Viriyasitavat et al., "Blockchain Technology for Applications in Internet of Things-Mapping From System Design Perspective", IEEE, dated Oct. 2019, 14 pages.
"Why is a Prime Number Used in ECDSA?", https://crypto.stackexchange.com/, 3 pages.
International Search Report and Written Opinion for International Patent Application No. PCT/US2022/043866, dated Jan. 18, 2023, 9 pages.
Murat Kantarcioglu et al., "A Cryptographic Approach to Securely Share and Query Genomic Sequences", IEEE, Sep. 2008, 12 pages.
Luka Milinkovic et al., "Pseudo-Random Number Generator Based on Irrational Numbers", Telsiks, dated Oct. 8, 2011, 4 pages.
Ryutarou Ohbuchi et al., "Watermarking Three-Dimensional Polygonal Models", IBM Tokyo Research Laboratory, dated 1997, 12 pages.
Guangfu Wu et al, "The security and privacy of blockchain-enabled EMR storage management scheme", IEEE, dated 2020, 5 pages.
Devika K. N. et al., "Parameterizable FPGA Implemetation of SHA-256 using Blockchain Concept", IEEE, dated Apr. 6, 2019, 5 pages.
Bong-Ju Jang et al., "A New Digital Watermarking for Architectural Design Drawing using LINEs and ARCs Based on Vertex", Department of Electronic Computer Engineer, Pusan University of Foreign Studies, dated 2004, 14 pages.
International Search Report and Written Opinion for International Patent Application No. PCT/US2022/046045, dated Jan. 27, 2023, 11 pages.

* cited by examiner

USE OF IRRATIONAL NUMBERS IN ELLIPTIC CURVE CRYPTOGRAPHY

FIELD OF THE INVENTION

The field of the invention is cryptography, and more particularly the field of elliptic curve cryptography (ECC).

BACKGROUND

The following description includes information that may be useful in understanding the present invention. It is not an admission that any of the information provided herein is prior art or relevant to the presently claimed invention, or that any publication specifically or implicitly referenced is prior art.

Public key cryptography relies on trap door functions, algorithms that are relatively easy to process in one direction, but difficult to process in the opposite direction. The greater the spread between these two directions, the more secure the system.

The first viable public key cryptographic system using a trap door function was introduced in 1977, based upon the RSA and the Diffie-Hellman key exchange algorithms. In the simplest version of RSA, data is encrypted using a quasi-prime public key, and data is decrypted using one of the prime number factors of the quasi prime.

Brute force can be used to factor small quasi-primes, by simply trying a series of prime numbers. Specialized algorithms such as the Quadratic Sieve and the General Number Field Sieve can be used to factor larger quasi-primes, but are still unable to efficiently crack 1024, 2048 bit and larger prime numbers.

Figure 1:
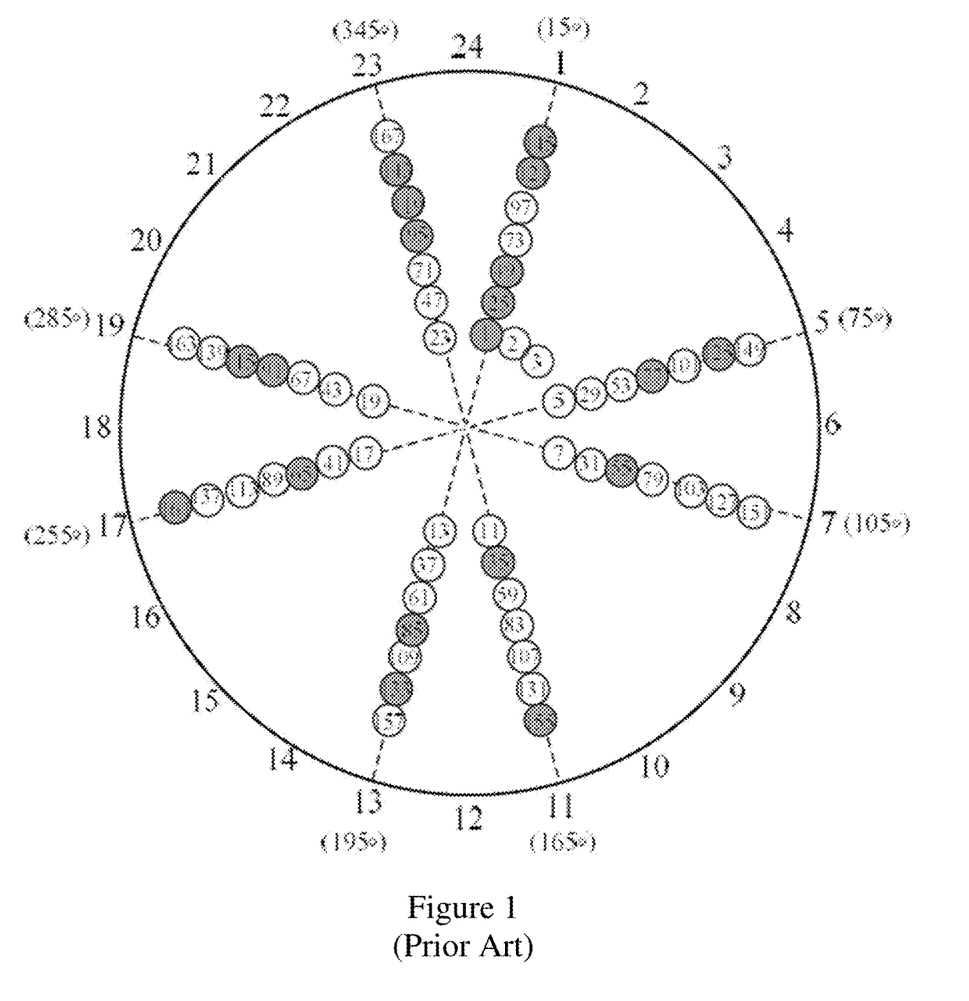
FIG. 1 is a prior art diagram of integers placed in a mod 24 arrangement.

In the late 2010s, the current inventor discovered relationships among prime numbers that permitted reliable factoring of 1024, 2048, and even 4096 bit prime numbers in seconds. Among the discoveries was the realization that prime numbers have an ordered distribution on the integer space. As shown in FIG. 1, when integers are placed in a mod 24 configuration, all primes greater than 2 and 3 only show up in the 1, 5, 7, 11, 13, 17, 19, and 23 mod positions. Quasi-primes, which are semiprimes excluding integers with factors of 2 and 3, are found in these positions as well. Since primes are restricted to 8 out of the 24 possible mod positions in the number space, that indicates a distribution that is not uniform, and therefore not random. Further discussion can be found in the 2018 publication "Prime Number Pattern Discovery, https://robertedwardgrant.com/prime-number-pattern-discovery-published/.

Elliptic curve cryptography (ECC) is based on the algebraic structure of elliptic curves over finite fields. Based up the difficulty of the Elliptic Curve Discrete Logarithm Problem (ECDLP), ECC allows much smaller keys than RSA for an equivalent level of security. ECC provides very fast key generation, fast key agreement, and fast signatures.

Public keys in ECC are EC points—pairs of integer coordinates {x, y}, laying on the curve. Due to their special properties, EC points can be compressed to just one coordinate+1 bit (odd or even). For example, the compressed public key, corresponding to a 256-bit ECC private key, is a 257-bit integer. Key generation in ECC cryptography can thus be as simple as securely generating a random integer in a certain range. Any number within the range can be a valid ECC private key.

ECC crypto algorithms can use different underlying elliptic curves. Different curves (e.g., Curve448, X448 and Ed448) provide different level of security (cryptographic strength), different performance (speed) and different key length, and also may involve different algorithms. See Elliptic Curve Cryptography (ECC), https://cryptobook.nakov.com/asymmetric-key-ciphers/elliptic-curve-cryptography-ecc.

NIST has standardized elliptic curve cryptography for digital signature algorithms in FIPS 186 and for key establishment schemes in SP 800-56A Rev3. https://csrc.nist.gov/publications/detail/sp/800-56a/rev-3/final.

Figure 2:
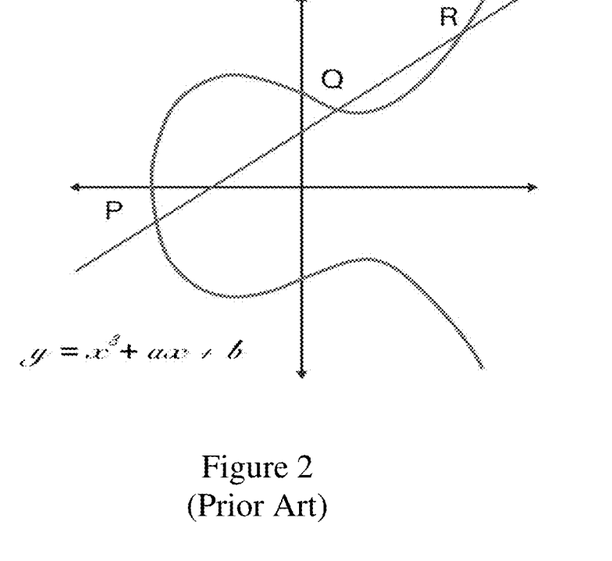
FIG. 2 is a generic prior art elliptic curve depicted in a Cartesian coordinate system.

FIG. 2 depicts an elliptic curve in the Cartesian coordinate system. Such curves are often described using the Weierstrass form:

$$y^2 = x^3 + ax + b$$

Alternatives include the Montgomery form:

$$By^2 = x3 + Ax^2 + x$$

and the Edwards form:

$$x^2 + y^2 = 1 + dx^2 y^2$$

All of these forms are thought to be birationally equivalent (isomorphic). According to the modularity theorem (formerly called the Taniyama-Shimura conjecture, Taniyama-Weil conjecture or modularity conjecture for elliptic curves), every rational elliptic curve is also a modular form in disguise. Or, more formally, the conjecture suggests that, for every elliptic curve $y^2 = Ax^3 + Bx^2 + Cx + D$ over the rationals, there exist nonconstant modular functions f(z) and g(z) of the same level N (the so-called j-conductor of the elliptic curve) such that $[f(z)]^2 = A[g(z)]^2 + Cg(z) + D$ with the same Dirichlet L-series. See https://mathworld.wolfram.com/Taniyama-ShimuraConjecture.html.

Simplified for purposes herein, every elliptical curve corresponds to (is equivalent to, is consistent with, or can be characterized as) a simple modular equation in the general form:

$$p^x \bmod q = r$$

For some integers p, q, r, and x, x is always a prime number and also the private key. However, since prime numbers exist in predictable positions in a mod 24 configuration, they are not randomly distributed, and cracking an elliptic curve based upon prime number exponents becomes relatively straightforward.

Although there appears to be no teaching, suggestion, or motivation in the prior art for using a non-prime number for x, several individuals have questioned whether the modulus needs to be prime. See "Elliptic curve over finite non-prime fields", https://math.stackexchange.com/questions/3811775/elliptic-curve-over-finite-non-prime-fields; and "Why are elliptic curves constructed using prime fields and not composite fields?" https://crypto.stackexchange.com/questions/43230/why-are-elliptic-curves-constructed-using-prime-fields-and-not-composite-fields. However, the answer to one of ordinary skill in the art is that use of primes is necessary to produce reliably stable elliptic curves. Using a non-prime modulo likely produces a ring instead of an elliptic curve. "Why is a prime number used in ECDSA?" https://crypto.stackexchange.com/questions/77884/why-is-a-prime-number-used-in-ecdsa.

These and all other publications referenced herein are incorporated by reference to the same extent as if each individual publication were specifically and individually indicated to be incorporated by reference. Where a definition or use of a term in an incorporated reference is inconsistent or contrary to the definition of that term provided herein, the definition of that term provided herein applies and the definition of that term in the reference does not apply.

What is still needed is a technology that resolves the basic weakness arising from use of prime numbers in constructing stable elliptic curve cryptography.

SUMMARY OF THE INVENTION

The inventive subject matter provides apparatus, systems and methods in which elliptical curve cryptography utilizes an elliptic curve consistent with the formula $p^x$ mod q=r, where x is a private key having an irrational number component. The irrational component is employed to provide much greater entropy than would be achieved where x is a prime number.

As used herein, the term "an elliptic curve consistent with the formula $p^x$ mod q=r" means that the elliptic curve can be expressed as "p" mod q=r" according to the modularity theorem.

Also as used herein, the terms "key having an irrational number component" and "key having an irrational component" are used interchangeably to mean that the key is derived from, or includes a series of, at least 25 sequential digits contained in a mantissa of an irrational number.

One should appreciate that the technical effect of the inventive subject matter herein is to provide increased security in elliptical curve cryptography.

Various objects, features, aspects and advantages of the inventive subject matter will become more apparent from the following detailed description of preferred embodiments, along with the accompanying drawing figures.

DETAILED DESCRIPTION

In their paper "A Study of the Digits of π, e and Certain Other Irrational Numbers", Dr. Johnson and Dr. Leeming discuss academic research conducted by the University of Victoria which demonstrates that irrational numbers are known to have a uniform distribution of digits (0-9) in their mantissas. This means that each digit is equally probable to occur at a given index in the mantissa, which makes it much more difficult to accurately predict.

The inventive subject matter takes advantage of this phenomenon to provide apparatus, systems and methods in which elliptical curve cryptography utilizes an elliptic curve consistent with the formula $p^x$ mod q=r, where x is a private key having an irrational number component. The irrational component is employed to provide much greater entropy than would be achieved where x is a prime number. Essentially, every mod or every outcome is equally possible and therefore less predictable.

Example 1

Figure 3:
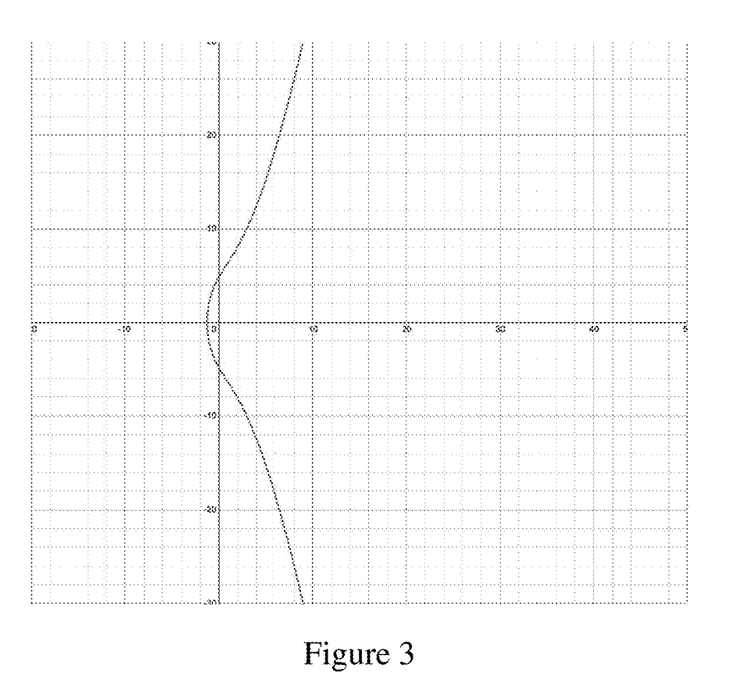
FIG. 3 is a prior art elliptic curve of formula $y^2=x^3+17x+12$, depicted in a Cartesian coordinate system.

FIG. 3 is a prior art elliptic curve of Formula 1, $y^2=x^3+17x+12$, depicted in a Cartesian coordinate system. The corresponding modular equivalent form is $3^x$ mod 17=12.

For any prime number x>2, $3^x$ mod 24 is in the mod 3 position, which gives the following equation:

$$3^\wedge x = 24y + 3 = 17z + 12$$
$$3^\wedge x = 24y + 3$$
$$24y + 3 = 1{,}594{,}323$$
$$y = 66{,}430$$
$$3^\wedge x = 17z + 12$$
$$17z + 12 = 1{,}594{,}323$$
$$z = 93{,}783$$

Therefore, knowing that x is prime number, it is relatively easy to establish that x=13.

$$(3^\wedge 13) \bmod 17 = 12$$

However, if for example x were the sqrt of 14, then $$(3^\wedge(sqrt(14))) \bmod 17 =$$
$$9.9851739782840114846758264536486159208698795 8061166$$

Since (3^(sqrt(14))) mod 17 lands on an irrational position, it is uniform in a mod 24 configuration and is more difficult to predict. This is due to the fact that sqrt(14) is an irrational number instead of a prime number.

Example 2

Figure 4:
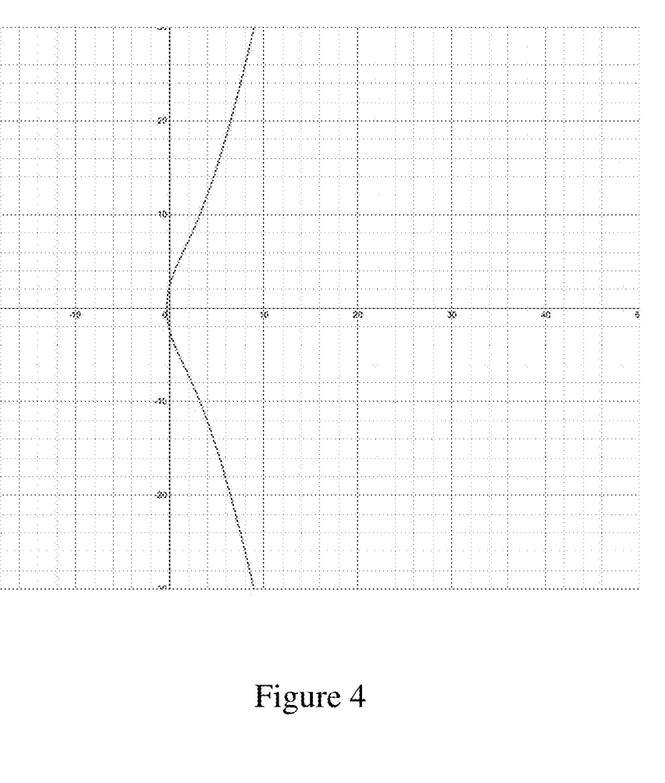
FIG. 4 is a prior art elliptic curve of Formula 2, $y^2=x^3+19x+6$, depicted in a Cartesian coordinate system.

FIG. 4 is a prior art elliptic curve of Formula 2, $y^2=x^3+19x+6$, depicted in a Cartesian coordinate system. The corresponding modular equivalent form is $5^x$ mod 19=6.

For any prime number x>2, $5^x$ mod 24 is in the mod 3 position, which gives the following equation.

$$5^\wedge x = 24y + 5 = 19z + 6$$
$$5^\wedge x = 24y + 5$$
$$24y + 5 = 48{,}828{,}125$$
$$y = 2{,}034{,}505$$
$$5^\wedge x = 19z + 6$$
$$19z + 6 = 48{,}828{,}125$$
$$z = 256{,}990$$

Therefore, knowing that x is prime number, it is relatively easy to establish that x=11

$$(5^{\wedge}11) \bmod 19 = 6$$

However, if for example x were the sqrt of 14, then $$(5^{\wedge}(sqrt(15))) \bmod 19 =$$
$$15.4472078099179837335353661644128682985263055535097$$

Since (5^(sqrt(15)) mod 19 lands on an irrational position, it is uniform in a mod 24 configuration and is more difficult to predict. This is due to the fact that sqrt(15) is an irrational number instead of a prime number.

Example 3

Figure 5:
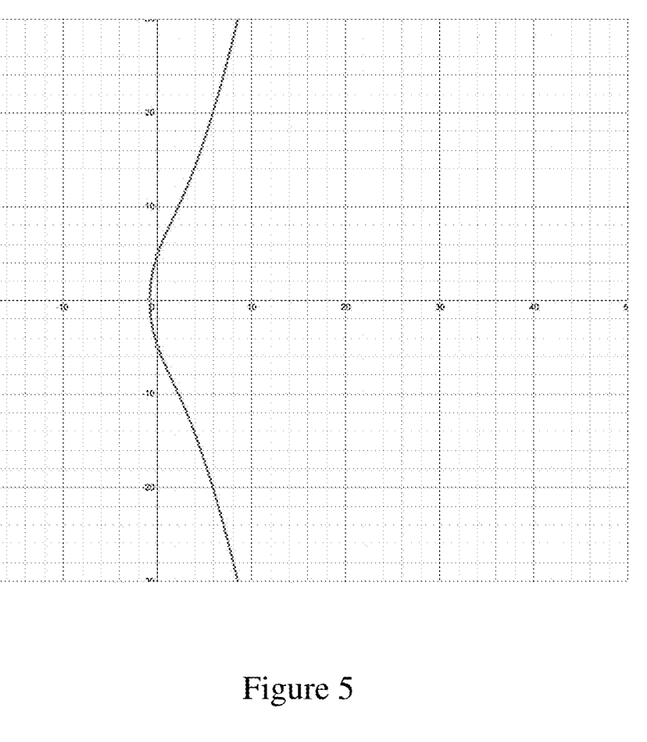
FIG. 5 is a prior art elliptic curve of Formula 3, $y^2=x^3+29x+24$, depicted in a Cartesian coordinate system.

FIG. 5 is a prior art elliptic curve of Formula 3, $y^2=x^3+29x+24$, depicted in a Cartesian coordinate system. The corresponding modular equivalent form is $7^x$ mod 29=24.

For any prime number x>2, $7^x$ mod 24 is in the mod 3 position, which gives the following equation.

$$7^{\wedge}x = 24y + 7 = 29z + 24$$
$$7^{\wedge}x = 24y + 7$$
$$24y + 7 = 232630513987207$$
$$y = 9692938082800$$
$$7^{\wedge}x = 29z + 24$$
$$29z + 24 = 232630513987207$$
$$z = 8021741861627$$

Therefore, $x = 17$ $$(7^{\wedge}17) \bmod 29 = 24$$

However, if for example x were the sqrt of 20, then $$(7^{\wedge}(sqrt(20))) \bmod 29 =$$
$$14.1845295892212562582618852640758417051932397541661$$

Since (7^(sqrt(20)) mod 19 lands on an irrational position, it is uniform in a mod 24 configuration and is more difficult to predict. This is due to the fact that sqrt(20) is an irrational number instead of a prime number.

Figure 6:
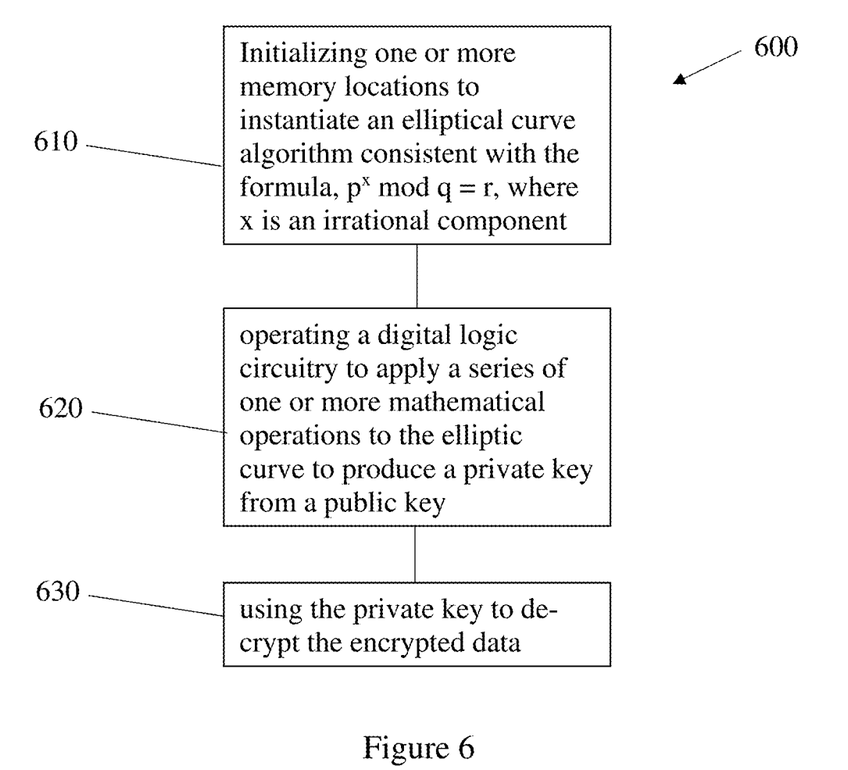
FIG. 6 is a flowchart describing a method of decrypting encrypted data using elliptical curve cryptography.

FIG. 6 is a flowchart describing a method of decrypting encrypted data using elliptical curve cryptography. In general, the method 600 includes:

Step 610—initializing one or more memory locations to instantiate an elliptical curve algorithm consistent with the formula, $p^x$ mod q=r, where x is an irrational component;

Step 620—operating a digital logic circuitry to apply a series of one or more mathematical operations to the elliptic curve to produce a private key from a public key; and Step 630—using the private key to de-crypt the encrypted data.

In preferred embodiments, the irrational component comprises a portion of a root of a non-perfect square, for example portion of a square root of 2 or a square root of 5. Also in preferred embodiments, p in the formula $p^x$ mod q=r is 3, 5, or 7.

Figure 7:
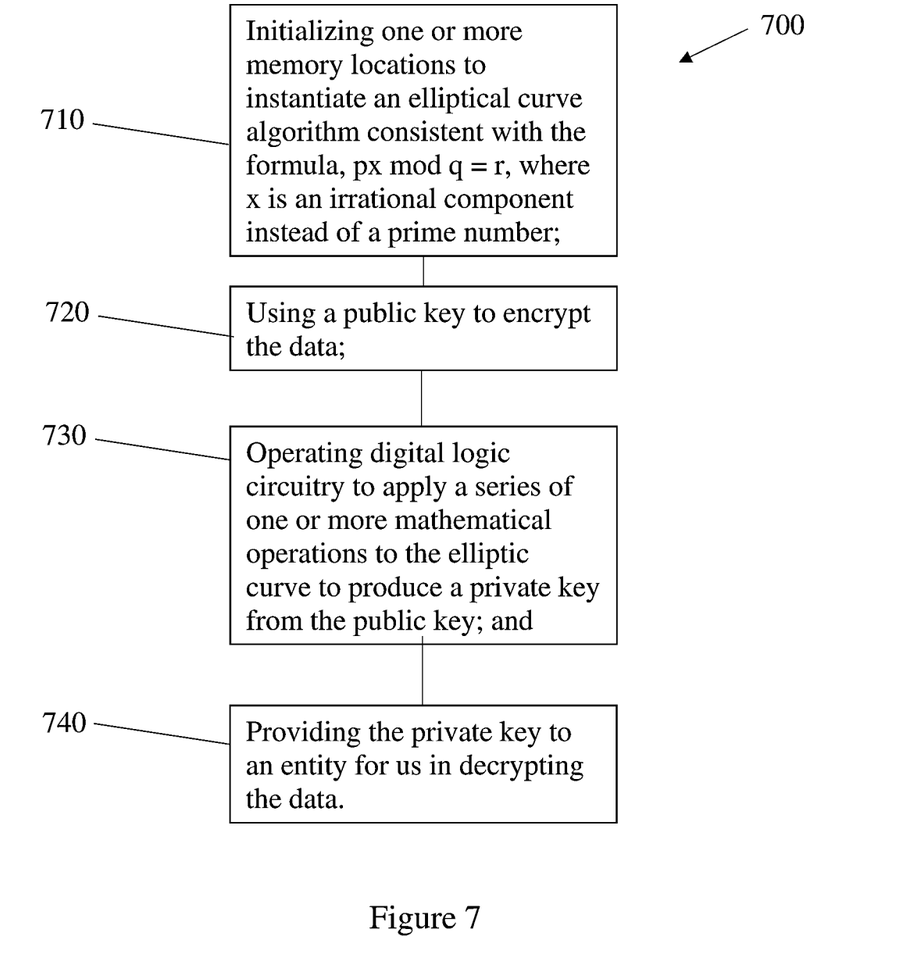
FIG. 7 is a flowchart describing a method of increasing entropy in elliptical curve cryptography, comprising.

FIG. 7 is a flowchart describing a method of increasing entropy in elliptical curve cryptography, comprising:

Step 710—initializing one or more memory locations to instantiate an elliptical curve algorithm consistent with the formula, px mod q=r, where x is an irrational component instead of a prime number;

Step 720—using a public key to encrypt the data;

Step 730—operating digital logic circuitry to apply a series of one or more mathematical operations to the elliptic curve to produce a private key from the public key; and Step 740—providing the private key to an entity for us in decrypting the data.

In the above discussion, references are made regarding memories and digital logic circuitry. It should be appreciated that the use of such terms is deemed to include servers, services, interfaces, portals, platforms, or other systems formed from computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Also, as used in the description above, and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Still further, all methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context.

What is claimed is:

1. A method of decrypting encrypted data using elliptical curve cryptography, comprising:

initializing one or more memory locations to instantiate an elliptical curve algorithm consistent with the formula, $p^x$ mod q=r, where x is an irrational component, wherein the irrational component comprises one of: (a) a portion of a root of a non-perfect square or (b) a portion of a square root of 2 or a square root of 5;

operating digital logic circuitry to apply a series of one or more mathematical operations to the elliptic curve to produce a private key from a public key;

using the private key to de-crypt the encrypted data.

2. The method of claim 1, wherein p is 3, 5, or 7 . . . .

3. A method of encrypting data using elliptical curve cryptography, comprising:
- initializing one or more memory locations to instantiate an elliptical curve algorithm consistent with the formula, $p^x \bmod q = r$, where x is an irrational component, wherein the irrational component comprises one of: (a) a portion of a root of a non-perfect square or (b) a portion of a square root of 2 or a square root of 5;
- using a public key to encrypt the data;
- operating digital logic circuitry to apply a series of one or more mathematical operations to the elliptic curve to produce a private key from the public key; and
- providing the private key to an entity for use in decrypting the data.

4. A method of increasing entropy in elliptical curve cryptography, comprising:
- initializing one or more memory locations to instantiate an elliptical curve algorithm consistent with the formula, $p^x \bmod q = r$, where x is an irrational component instead of a prime number, wherein the irrational component comprises one of: (a) a portion of a root of a non-perfect square or (b) a portion of a square root of 2 or a square root of 5;
- using a public key to encrypt the data;
- operating digital logic circuitry to apply a series of one or more mathematical operations to the elliptic curve to produce a private key from the public key; and
- providing the private key to an entity for us in decrypting the data.

\* \* \* \* \*